US011675717B2

(12) United States Patent
Buelow et al.

(10) Patent No.: US 11,675,717 B2
(45) Date of Patent: Jun. 13, 2023

(54) TRANSMISSION OF DIAGNOSTIC AND/OR PARAMETER DATA BETWEEN A CONTROL MODULE AND AN INPUT/OUTPUT MODULE

(71) Applicant: WAGO Verwaltungsgesellschaft mbH, Minden (DE)

(72) Inventors: Alexander Buelow, Stadthagen (DE); Markus Weidner, Minden (DE); Michael Langreder, Hessisch Oldendorf (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 0 days.

(21) Appl. No.: 17/682,706

(22) Filed: Feb. 28, 2022

(65) Prior Publication Data

US 2022/0179807 A1 Jun. 9, 2022

Related U.S. Application Data

(63) Continuation of application No. PCT/EP2020/070415, filed on Jul. 20, 2020.

(30) Foreign Application Priority Data

Aug. 29, 2019 (DE) .................. 10 2019 123 146.9

(51) Int. Cl.
 *G06F 13/20* (2006.01)
 *G05B 19/042* (2006.01)
(52) U.S. Cl.
 CPC .......... *G06F 13/20* (2013.01); *G06F 2213/40* (2013.01)

(58) Field of Classification Search
 CPC ............................. A01G 25/167; B60W 10/02
 See application file for complete search history.

(56) References Cited

U.S. PATENT DOCUMENTS

| 11,588,659 | B2 * | 2/2023 | Bleiker | H04L 12/2816 |
|---|---|---|---|---|
| 2005/0043823 | A1 * | 2/2005 | Morita | G09G 3/3688 |
| | | | | 700/11 |
| 2008/0129495 | A1 * | 6/2008 | Hitt | A01G 25/167 |
| | | | | 340/539.26 |
| 2008/0188996 | A1 * | 8/2008 | Lucas | B60T 8/174 |
| | | | | 701/1 |
| 2016/0339987 | A1 * | 11/2016 | Walthert | B62J 11/00 |
| 2018/0126994 | A1 * | 5/2018 | Chang | B60W 10/02 |

(Continued)

FOREIGN PATENT DOCUMENTS

| DE | 102009013303 A1 | 9/2010 |
|---|---|---|
| DE | 102010062670 A1 | 6/2012 |

OTHER PUBLICATIONS

International Search Report dated Sep. 17, 2020 in corresponding application PCT/EP2020/070415.

(Continued)

*Primary Examiner* — Getente A Yimer
(74) *Attorney, Agent, or Firm* — Muncy, Geissler, Olds & Lowe, P.C.

(57) ABSTRACT

Illustrated is an I/O module which is configured for cyclically transmitting and receiving telegrams, wherein an area in which a data record can be transmitted in its entirety is provided in the telegrams, as well as an area capable of containing only a part of a data record, so that said data record is transmitted, distributed over several telegrams.

11 Claims, 4 Drawing Sheets

(56) References Cited

U.S. PATENT DOCUMENTS

2019/0283768 A1* 9/2019 Das .................. B60W 50/0205
2022/0413458 A1* 12/2022 Lovegrove ............. G06N 20/00

OTHER PUBLICATIONS

German Search Report dated Jul. 24, 2020 in corresponding application 10 2019 123 146.9—partial translation identifies relevant portion of cited documents Werner Kreisel "*Bustechnologien für die Automation*", "*IO Link Systembeschreibung, Technologie und Anwendung*", "*Kunbus GmbH Aufbau einer AS-i-Nachricht*"and standard "*Norm DIN EN 61131-9*".
Kreisel et al; "*Bustechnologien für die Automation*"; 1998; ISBN 3-7785-2616-2.
"*IO Link Systembeschreibung, Technologie und Anwendung*"; Version Mar. 2018; Profibus Nutzerorganisation e. V.
"*Kunbus GmbH Aufbau einer AS-i-Nachricht*"; Kunbus GmbH; Jul. 22, 2020.
"*Norm DIN EN 61131-9*"; DKE Deutsche Kommission Elektrotechnik Infomationstechnik in DIN und VDE, Feb. 2015.

\* cited by examiner

TRANSMISSION OF DIAGNOSTIC AND/OR PARAMETER DATA BETWEEN A CONTROL MODULE AND AN INPUT/OUTPUT MODULE This nonprovisional application is a continuation of International Application No. PCT/EP2020/070415, which was filed on Jul. 20, 2020, and which claims priority to German Patent Application No. 10 2019 123 146.9, which was filed in Germany on Aug. 29, 2019, and which are both herein incorporated by reference.

BACKGROUND OF THE INVENTION

Field of the Invention

The present invention relates to a system with a control module, an input/output module (I/O module), and a plurality of sensors and/or actuators, wherein the I/O module is configured for cyclically deriving, on the basis of a parameter set, a state data record from measurement signals of the sensors, and/or for cyclically deriving control signals for controlling the actuators from a control data record, and the control module is configured for cyclically receiving first telegrams of a constant size with one state data record each from the I/O module, and/or for transmitting second telegrams of a constant size with one control data set each to the I/O module.

Description of the Background Art

An I/O module as it is used in fieldbus systems, for example, typically may be parameterized with respect to its behavior in the processing of process data. Moreover, data regarding the processing of process data may frequently be obtained from an I/O module and obtained for finding errors (diagnostic data). However, both providing a parameter set and providing diagnostic data often requires a (manual) maintenance intervention, which entails an additional effort and, possibly, pausing the productive operation of the I/O module.

Said issues are additionally exacerbated if the I/O module is a safety-oriented I/O module, i.e. an I/O module in which the avoidance of errors (by reducing manual "error prone" interventions, if necessary), the recognition of errors during operation (by evaluating diagnostic data, if necessary) and the correction of errors (by changing the parameter set, if necessary) are of particular importance and also, most frequently, subject to certain regulatory requirements.

SUMMARY OF THE INVENTION

The present invention is based on the object of improving the prior art.

A system according to an exemplary embodiment of the invention comprises a plurality of sensors and/or actuators, an I/O module and a control module. The I/O module is configured for cyclically deriving, on the basis of a parameter set, a state data record from measurement signals of the sensors, and/or for cyclically deriving control signals for controlling the actuators from a control data record. The control module is configured for cyclically receiving first telegrams (input process images) of a constant size with one state data record each from the I/O module, and/or for transmitting second telegrams (output process images) of a constant size with one control data set each to the I/O module.

The I/O module is further configured for transmitting diagnostic data regarding the function of the I/O module, of the sensors and/or of the actuators, distributed over several first telegrams, to the control module, and/or the control module is further configured to transmit, distributed over several second telegrams, data describing the parameter set to the I/O module.

Within the context of the present description and the claims, the term "I/O module" may be understood to mean, in particular, an electronic device that can be linked to a control module, has one or several (typically analog and/or digital) input and/or output terminals for connecting the sensors and/or actuators, and additionally a bus interface, via which the I/O module is connected to the control module via a local bus in the linked state. Further, the term "control module", may be understood, in particular, to denote a fieldbus coupler or a fieldbus controller, which is connected to a higher-level control unit (e.g. a process control unit) via a fieldbus.

Further, the term "diagnostic data", may be understood, in particular, to denote data which were recorded during operation and which document the operation of the I/O module. Further, the term "parameter set", may be understood, in particular, to denote the entirety of all (adaptable) parameter values (persistently) stored in an I/O module that determine the behavior of the I/O module during the processing of process data (i.e. state data and/or control data).

Further, the term "state data record", may be understood, in particular, to denote the entirety of all data generated in a cycle by an I/O module that indicate the state of sensors connected with the I/O module via the input terminals. Moreover, the term "control data record", may be understood, in particular, to denote the entirety of all data received in a cycle by an I/O module that are intended for controlling the state of actuators connected with the I/O module via the output terminals.

Furthermore, the term "telegram", may be understood, in particular, to denote a sequence of a predetermined number of payload data bits whose number is fixed or specified in a telegram header ("message header") placed before the payload data bits, or a sequence of payload data bits started with a telegram head and ended with a telegram end segment. In this context, the phrase "distributed over several telegrams", may be understood, in particular, to denote a transmission strategy in which a data record, which is evaluated/used in its entirety on the side of the receiver, is divided and the parts are serially transmitted.

The control module can be further configured for deriving a diagnostic data record from the diagnostic data distributed over several first telegrams, and/or the I/O module is further configured for deriving the parameter set from the data that are distributed over several second telegrams and describe the parameter set.

The I/O module can be further configured for acknowledging the receipt of the data describing the parameter set after the receipt of each of the second telegrams, and for transmitting data regarding the acknowledgement instead of or in addition to the diagnostic data in the first telegrams.

The control module can be further configured for acknowledging the receipt of the diagnostic data after the receipt of each of the first telegrams, and for transmitting data regarding the acknowledgement instead of or in addition to the data, which describes the parameter set, in the second telegrams.

The I/O module can be further configured for performing a self-parameterization on the basis of the data describing the parameter set.

The control module can be further configured for determining the control data records while taking into account the state data records.

A method according to an exemplary embodiment of the invention for communicating data between an I/O module and a control module comprises a cyclical transmission of first telegrams of a constant size from the I/O module to the control module, and of second telegrams of a constant size from the control module to the I/O module, wherein in the first telegrams, in each case, a fixed number of first bits is reserved and used for the serial transmission of a first data record, and in the second telegrams, in each case, a fixed number of second bits is reserved and used for the serial transmission of a second data record.

The second data record can comprise parameters for the self-parameterization of the I/O module.

The first data record can comprise diagnostic data or data acknowledging the receipt of the parameters.

The I/O module can assemble a parameter set from parameters transmitted in several second telegrams.

A first telegram can comprise a state data record, and a second telegram comprises a control data record determined on the basis of the state data record.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
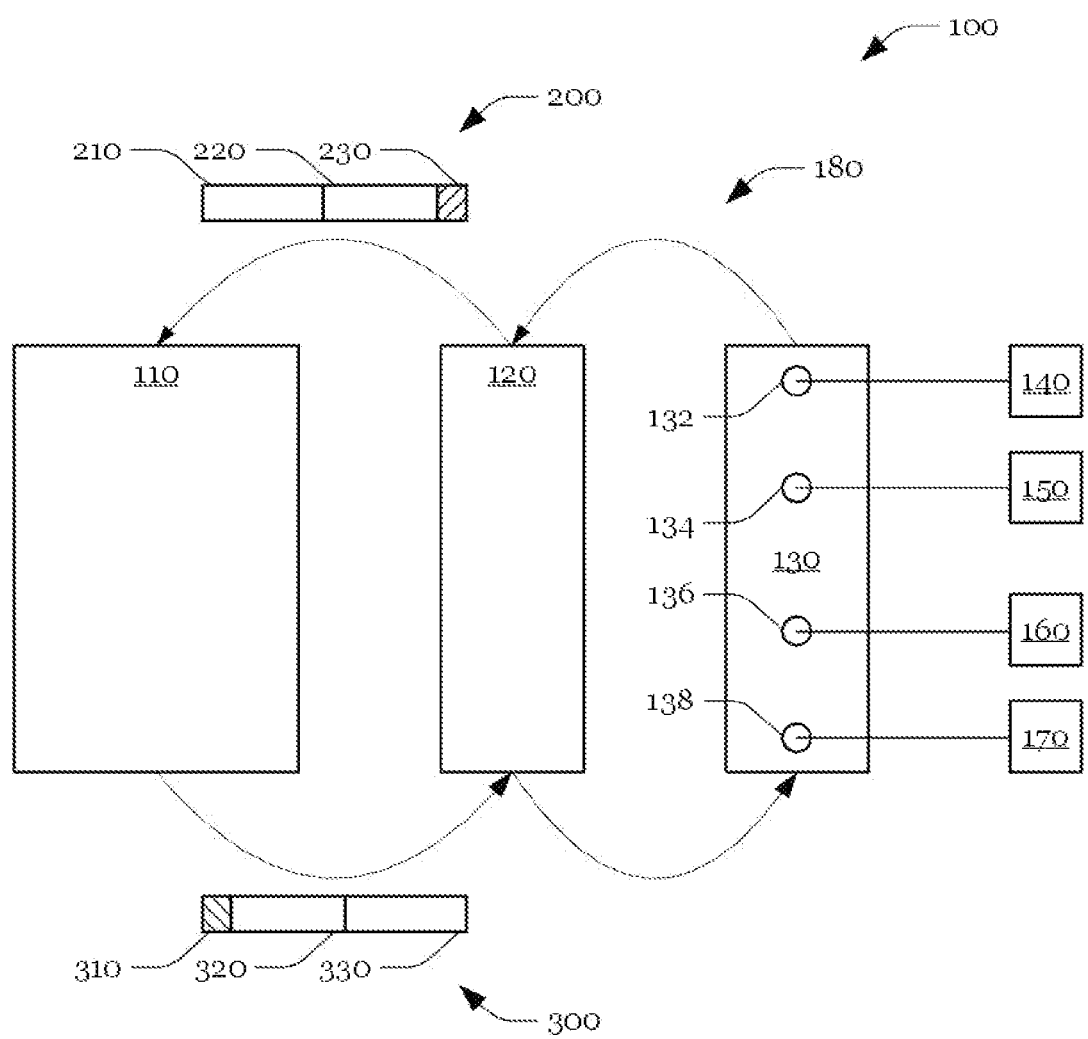
FIG. 1 shows a system according to the invention.
Figure 2:
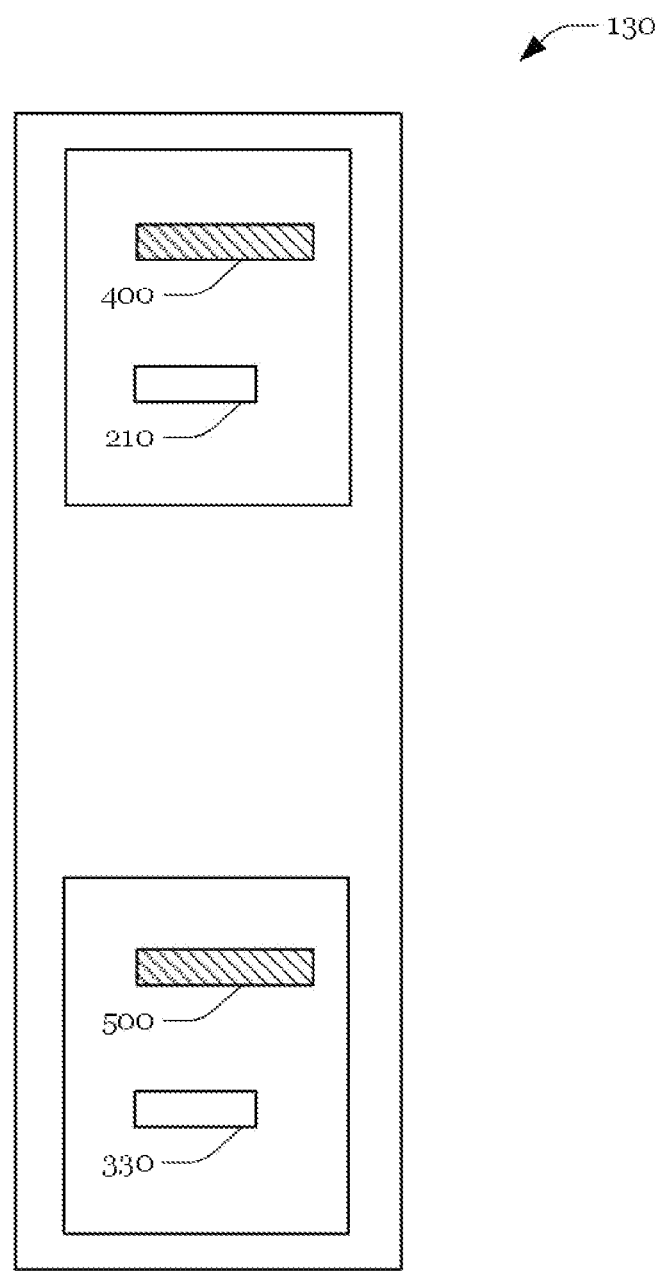
FIG. 2 illustrates the storing of a parameter set, a control data record, a state data record and of diagnostic data in an I/O module of a system according to the invention.

FIGS. 1 and 2 schematically illustrate (elements) of a system 100 according to the invention, which comprises a control module 110 and two I/O modules 120, 130 (linked to the control module 110). As is shown in FIG. 1, the I/O module 130 has several input terminals 132, 134 with which sensors 140, 150 are connected, and several output terminals 136, 138 with which actuators 160, 170 are connected. In order to configure the I/O module 130, the control module 110 transmits to the I/O module 130 several telegrams 300 with data 310 describing a parameter set 500. The I/O module 130 derives from the parameter set 500 rules on how the input terminals 132, 134 and the output terminals 136, 138 are to be used.

For example, the parameter set 500 may specify whether, and particularly how, an input terminal 132, 134 or an output terminal 136, 138 are to be operated. For example, the parameter set 500 may specify whether an input terminal 132, 134 is to be operated as an analog input terminal or as a digital input terminal, or whether an output terminal 136, 138 is to be operated as an analog output terminal or as a digital output terminal. Moreover, the parameter set 500 may indicate current and/or voltage level ranges that are to be complied with when reading in or outputting signals. In addition, the parameter set 500 may indicate how the input signals (sensor signals) are to be mapped to a state data record 210, and/or how output signals (control signals) are to be derived from a control data record 330.

Because the transmission of the data 310 describing the parameter set 500 only has to take place within the context of an (initial) configuration or a reconfiguration (as the parameter set 500 can be persistently stored in the I/O module 130), and the reserved bandwidth for the transmission of the data 310 from the control module 110 to the I/O module 130 is limited for ensuring a prompt transmission of control data 330, the data required for describing the entire parameter set 500 are distributed over several telegrams 300. In this case, the telegrams 300 are dimensioned in such a way that a complete control data record 330 can also be transmitted in addition to the data 310, whereby the parameterization can take place without any disruption in the process data communication.

In order to adapt the parameter set 500, several telegrams 300 have to be received by the I/O module 130. In this case, each telegram 300 may include control data records 330, 320 for the linked I/O modules 120, 130 as well as data 310 from which a part of the parameter set 500 can be derived. In addition, each telegram 300 may include data by means of which transmission errors can be recognized (and, if necessary, corrected). For example, the telegrams 300 may correspond to an implementation of a safety-oriented communication channel in which the correct receipt of telegrams 300 is acknowledged and data 310 are retransmitted, if necessary, if (irreparable) transmission errors occur. The control module 110 and the I/O module 130 can also carry out procedures for error recognition and/or error correction.

For example, the I/O module 130 may verify the plausibility of measurement signals read in via the input terminals 132, 134 against a range of value (taking into account the parameter set 500, if necessary), balance them, or verify the plausibility of the state data record 210 derived from the measurement signals before the former is transmitted to the control module 110 by means of a telegram 200 via the bus (or the daisy chain) 180. Moreover, the control module 110 may check the telegram 200 for transmission errors if the I/O module 130 has added to the telegram 200 data with which transmission errors can be recognized (and, if necessary, corrected). In addition, the control module 110 can verify the plausibility of the received state data record 210 (if necessary, taking into account the parameter set 500).

Furthermore, diagnostic data 230 regarding the function of the I/O module 130, the sensors 140, 150 and/or the actuators 160, 170 may be added to the telegram 200. For example, the I/O module 130 may, cyclically or acyclically (e.g. in response to a request from the control module 110), generate a diagnostic data record 400 and transmit data 230 describing the latter to the control module 110, distributed over several telegrams 200. In this case, it may be provided that the entire diagnostic data record 400 is (always) replicated in the control module 110 or that only (conspicuous) parts of the diagnostic data record 400 are replicated in the control module 110.

Figure 3:
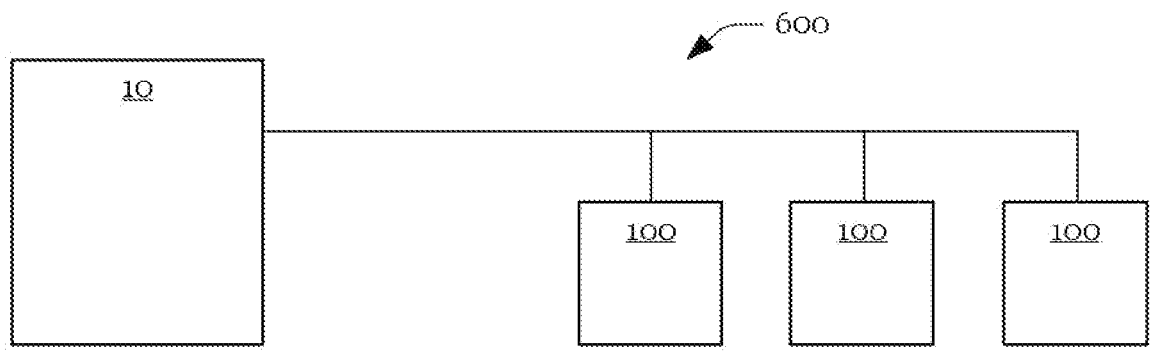
FIG. 3 shows an assembly with several systems according to the invention, which are connected to a higher-level control unit via a fieldbus.

The control module 110 may locally process the received state data record 210 and received diagnostic data 230 and/or forward them to a higher-level control unit 10 which, as shown in FIG. 3, may be connected via a fieldbus 600 to a plurality of systems 100, monitoring/controlling the latter. For example, the higher-level control unit 10 may determine a control data record 330 taking into account the received state data record 210, and transmit the former to the respective system 100. Moreover, the higher-level control unit 10 may evaluate received diagnostic data 230 and, if necessary, take measures to correct errors or bring the system 100 concerned (or all systems 100) into a safe state.

The control data record 330 generated (locally) by the higher-level control unit 10 or the control module 110 is received by the I/O module 130 and (if necessary, after a check for transmission errors/correction of transmission errors) used for deriving control signals for controlling the actuators 160, 170 and outputting them at the output terminals 136, 138. In addition, the (correct) receipt of control data records 330 may be acknowledged, wherein bandwidth that is available if no diagnostic data 230 are transmitted can be used for the acknowledgement. That is, a diagnostic data record 400 or a parameter set 500 can be (serially) transmitted, and a feedback channel for acknowledging the (correct) receipt of telegrams 200, 300 can be realized, by means of the bandwidth that is freely available in the telegrams 200, 300.

Figure 4:
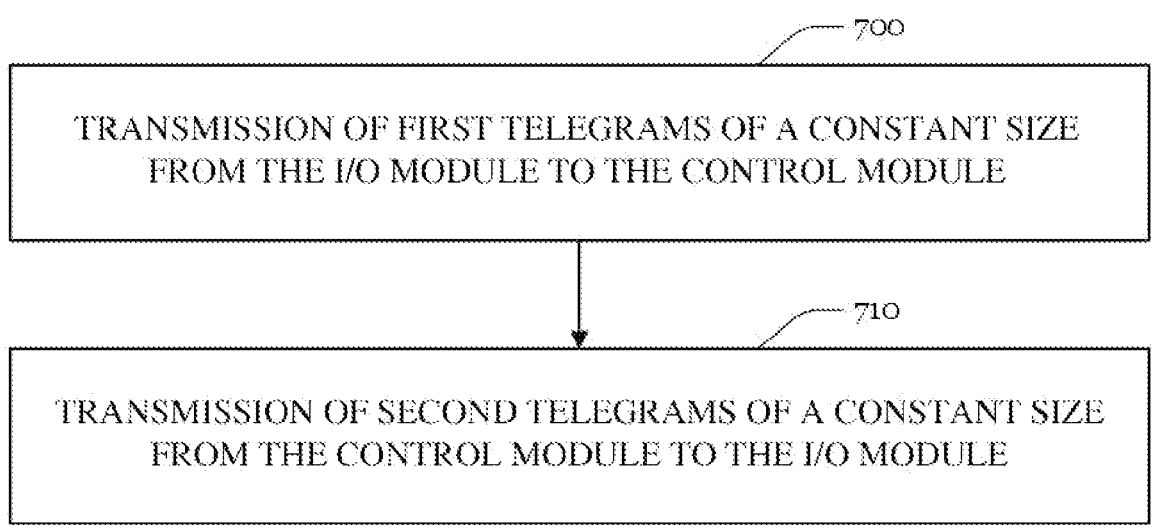
FIG. 4 shows a process chart of the communication of data between an I/O module and a control module.

FIG. 4 shows a process chart of a process for communicating data between the I/O module 130 and the control module 110. In the process, first telegrams 200 of a constant size are transmitted in step 700 from the I/O module 130 to the control module 110, and second telegrams 300 of a constant size are transmitted in step 800 from the control module 110 to the I/O module 130. In this case, a fixed number of first bits 230 is reserved in each case in the first telegrams 200, which can be used for the serial transmission of a first data record, such as a diagnostic data record 400, for instance. Also, a fixed number of second bits 310 is reserved in each case in the second telegrams 300, which can be used for the serial transmission of a second data record, such as a parameter set 500, for instance.

The I/O module 130 can perform a self-parameterization with the parameter set 500. If, for example, the I/O module 130 is replaced (with a constructionally identical I/O module 130), the new I/O module 130 can receive the parameter set 500 from the control module 110 and parameterize itself, so that the integration of the new I/O module 130 into the system 100 is simplified (and errors as they may occur in the case of a manual parameterization are excluded). Moreover, the diagnostic data record 400 can be used for checking the I/O module 130 during operation. In addition, the reserved bits 230 may be used for acknowledging the receipt of telegrams 300, the control data records 330 or the parameters.

Figure 5:
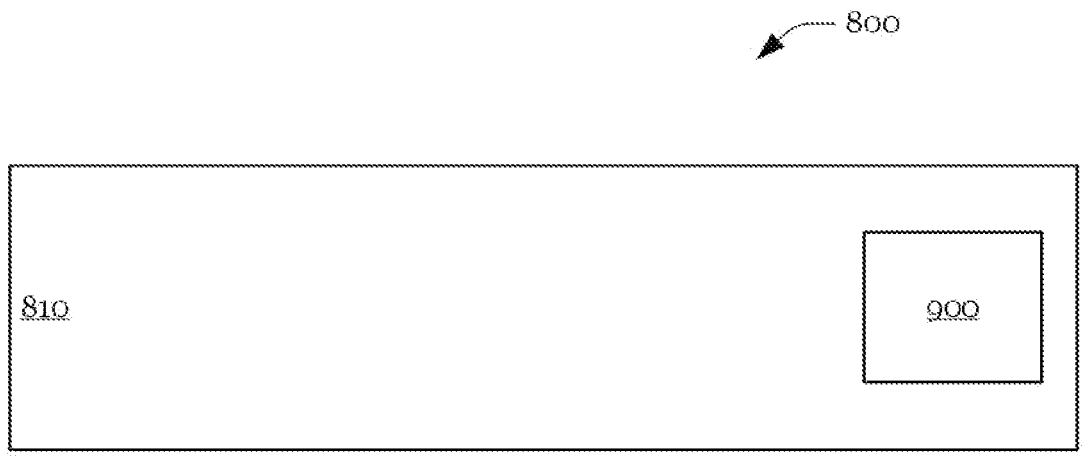
FIGS. 5 and 6 illustrate the embedding of a serializing protocol into a process image.
Figure 6:
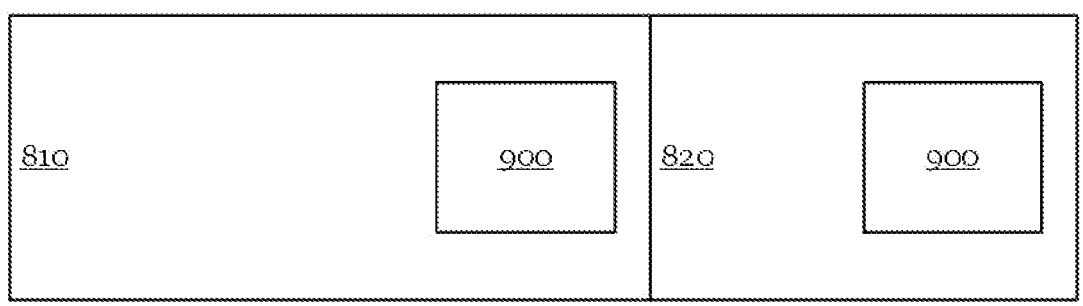

In addition to process data 210, 330, other data may also be exchanged in this manner between the control module 110 and the I/O module 130, by embedding a serializing protocol 900 into the process image 800, as illustrated in FIGS. 5 and 6. This is advantageous inasmuch the process image 800 has to be expanded to only a minor extent for the serializing data channel 900. As described above, the serializing protocol 900 may additionally be provided with a handshake mechanism, so that issues caused by delays in transmission or repetitions of telegrams in the communication path can be dealt with.

The serializing protocol 900 may be integrated into both conventional (non-safety-oriented) communication links and into safety-oriented communication links. In a conventional communication link, the serializing data channel 900 is integrated into the non-safety-oriented part 810 of the process image 800, as is schematically illustrated in FIG. 5. In the case of a safety-oriented communication link, the serializing channel 900 can be integrated into the safety-oriented part 820 of the process image 800 or into the non-safety-oriented part 810 of the process image 800, as FIG. 6 schematically illustrates.

If the serializing channel 900 is integrated into the safety-oriented part 820 of the process image 800, then this data transmission is also protected by the measures of the safety-oriented communication protocol. In addition, safety-oriented data may also be transmitted via a serializing communication channel 900 integrated into the non-safety-oriented part 810 of the process image 800. For example, the data may be expanded with a check value in order to ensure integrity. In order to be able to additionally ensure that the serializing communication channel 900 transmits data to the correct I/O module 130, a security identity of the I/O module 130 that can be set in the I/O module 130 can be incorporated into this check value.

Further protocol layers can be implemented on the serializing channel 900, which makes a quasi-parallel operation of different utilities possible. In particular, parameter sets may be transmitted directly from the control module 110 to the I/O modules 120, 130 via the serializing data channel 900. Thus, the necessity of a third entity carrying out the parameterization no longer exists. The user is able to directly input the parameters into a function block, e.g. in a program with a graphical interface with which the control module 110 is configured.

In summary, at least the following advantages are provided:

1. The serializing communication channel 900 can be established in the conventional part 810 as well as in the safety-oriented part 820 of the process image 800.
2. If the communication channel 900 is established within the safety-oriented part 820, it is largely independent of the safety protocol.
3. Existing safety-oriented protocols need not be changed and thus remain compliant with specifications.
4. Serialization reduces the storage space required in the process image 800, or limits and fixes the required bandwidth.
5. Serialization permits the transmission of data packets with variable sizes.
6. The serializing communication channel 900 can be used for implementing higher protocol layers, whereby different utilities can be operated in a quasi-parallel manner.
7. The serializing communication channel 900 is immediately operational upon the system 100 being started up.
8. If the serializing communication channel 900 has a fixed bandwidth and the I/O module 130 and the control module 110 use the same cycle time for the data exchange, a transmission time of the data can be predicted and guaranteed. Thus, a prioritization of transmission data is possible.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A system comprising:
a plurality of sensors and/or actuators;
an input/output module (I/O module); and
a control module,
wherein the I/O module cyclically derives, on the basis of a parameter set, a state data record from measurement signals of the sensors and/or cyclically derives control signals for controlling the actuators from a control data record; and
wherein the control module cyclically receives first telegrams of a constant size with one state data record each from the I/O module, and/or for transmitting second telegrams of a constant size with one control data set each to the I/O module,
wherein the I/O module transmits diagnostic data regarding the function of the I/O module, of the sensors and/or of the actuators, distributed over several first telegrams, to the control module, and/or
wherein the control module transmits, distributed over several second telegrams, data describing a parameter set to the I/O module.

2. The system according to claim 1, wherein the control module derives a diagnostic data record from the diagnostic data distributed over several first telegrams and/or wherein the I/O module derives the parameter set from the data that are distributed over several second telegrams and describe the parameter set.

3. The system according to claim 2, wherein the I/O module acknowledges receipt of the data describing the parameter set after a receipt of each of the second telegrams and for transmitting data regarding the acknowledgement instead of or in addition to the diagnostic data in the first telegrams.

4. The system according to claim 2, wherein the control module acknowledges receipt of the diagnostic data after the receipt of each of the first telegrams, and transmits data regarding the acknowledgement instead of or in addition to the data, which describe the parameter set, in the second telegrams.

5. The system according to claim 1, wherein the I/O module performs a self-parameterization on the basis of the data describing the parameter set.

6. The system according to claim 1, wherein the control module determines the control data records while taking into account the state data records.

7. A method for communicating data between an I/O module and a control module, the method comprising:
cyclically transmitting first telegrams of a constant size from the I/O module to the control module and second telegrams of a constant size from the control module to the I/O module;
reserving, in each of the first telegrams, a fixed number of first bits that are used for the serial transmission of a first data record; and
reserving in each of the second telegrams, a fixed number of second bits that are used for the serial transmission of a second data record.

8. The method according to claim 7, wherein the second data record comprises parameters for the self-parameterization of the I/O module.

9. The method according to claim 8, wherein the first data record comprises diagnostic data or data acknowledging the receipt of the parameters.

10. The method according to claim 8, wherein the I/O module assembles a parameter set from parameters transmitted in several second telegrams.

11. The method according to claim 7, wherein a first telegram comprises a state data record and a second telegram comprises a control data record determined on the basis of the state data record.

* * * * *